US011091035B2

(12) United States Patent
Okada

(10) Patent No.: US 11,091,035 B2
(45) Date of Patent: Aug. 17, 2021

(54) AUTOMATIC DRIVING SYSTEM

(71) Applicant: Toyota Jidosha Kabushiki Kaisha, Toyota (JP)

(72) Inventor: Yu Okada, Sunto-gun Shizuoka-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 215 days.

(21) Appl. No.: 16/514,063

(22) Filed: Jul. 17, 2019

(65) Prior Publication Data

US 2020/0070659 A1 Mar. 5, 2020

(30) Foreign Application Priority Data

Aug. 28, 2018 (JP) ................. JP2018-159589

(51) Int. Cl.
  *B60K 31/00* (2006.01)
  *B60W 40/04* (2006.01)
  (Continued)

(52) U.S. Cl.
  CPC .......... *B60K 31/0008* (2013.01); *B60R 11/04* (2013.01); *B60T 7/12* (2013.01);
  (Continued)

(58) Field of Classification Search
  CPC ............ B60K 31/0008; B60K 2310/22; B60K 2310/264; B60K 2370/168; B60K 2370/179; B60K 2310/244; B60W 40/04; B60W 30/16; B60W 50/087; B60W 2720/10; B60W 2754/30; B60W 2754/50; B60W 30/18163; B60W 2050/146; B60R 11/04; B60R 2300/804; B60T 7/12; B60T 2201/024; B60T 2201/085; B60T 7/042; B60T 7/22; G01S 13/931; G01S 17/86; G01S 2013/9325; G01S 2013/932; G01S 2013/9323; G01S 2013/9321; G01S 17/931; G06K 9/00805; G06K 9/00798
  See application file for complete search history.

(56) References Cited

U.S. PATENT DOCUMENTS 10,466,717 B1 * 11/2019 Su ..................... G07C 5/008
2016/0221575 A1 * 8/2016 Posch ................ B60W 30/14
(Continued)

FOREIGN PATENT DOCUMENTS

JP 2007-326494 A 12/2007

*Primary Examiner* — Mary Cheung
(74) *Attorney, Agent, or Firm* — Dinsmore & Shohl LLP

(57) ABSTRACT

An automatic driving system includes: an information acquiring device configured to acquire driving environment information indicating a driving environment of the vehicle; a running control device configured to execute lane change control from a first lane to a second lane during automatic driving of the vehicle based on the driving environment information; and a display device configured to display an upper limit value of a running speed of the vehicle which is set by a driver of the vehicle during automatic driving. The display device is configured to display a deviation value which is calculated based on a target value of the running speed and the upper limit value along with the upper limit value during a speed-deviation running in which the running speed is higher than the upper limit value.

3 Claims, 12 Drawing Sheets

(51) Int. Cl.
  *G01S 13/931* (2020.01)
  *G06K 9/00* (2006.01)
  *B60R 11/04* (2006.01)
  *B60T 7/12* (2006.01)
  *B60W 30/16* (2020.01)

(52) U.S. Cl.
  CPC ............ *B60W 30/16* (2013.01); *B60W 40/04* (2013.01); *G01S 13/931* (2013.01); *G06K 9/00805* (2013.01); *B60R 2300/804* (2013.01); *B60T 2201/024* (2013.01); *B60T 2201/085* (2013.01)

(56) References Cited

U.S. PATENT DOCUMENTS

| | | | |
|---|---|---|---|
| 2017/0101097 A1* | 4/2017 | Buchner | B60W 30/16 |
| 2019/0155291 A1* | 5/2019 | Heit | B60W 30/00 |
| 2019/0163180 A1* | 5/2019 | Patel | G08G 1/091 |

\* cited by examiner

AUTOMATIC DRIVING SYSTEM

CROSS-REFERENCE TO RELATED APPLICATION

This application claims priority to Japanese Patent Application No. 2018-159589 filed on Aug. 28, 2018, incorporated herein by reference in its entirety.

BACKGROUND

1. Technical Field

The disclosure relates to an automatic driving system. More particularly, the disclosure relates to a system that automatically executes lane change control.

2. Description of Related Art

Japanese Unexamined Patent Application Publication No. 2007-326494 (JP 2007-326494 A) discloses a system including a control device that executes first control and second control and a display device. When the first control is executed, the control device controls a vehicle such that a vehicle speed does not exceed a first set speed. When the second control is executed, the control device controls the vehicle such that the vehicle speed is kept at a second set speed. When both the first control and the second control are executed, the display device displays the lower one of the first and second set speeds.

SUMMARY

It is conceivable that the control device additionally executes lane change control (hereinafter also referred to as "LC control") from a first lane to a second lane in addition to the first control and the second control. The first lane is an original lane before changing lanes. The second lane is a lane after changing lanes. In this case, it is assumed that the control device controls the vehicle such that the vehicle speed does not exceed the first or second set speed.

However, it may not be appropriate that the vehicle abides by the first and second set speeds. That is, in order to successfully execute automatic lane change without handing over driving from the system to a driver, the vehicle may have to run temporarily at a speed deviating from the first and second set speeds. When such deviation running is performed, there is a concern that a driver will mistakenly judge that there is an abnormality in the system. Then, there is a likelihood that automatic lane change will not be successfully executed due to a driver's intervention during driving.

The disclosure provides a technique for preventing a driver from feeling uneasy due to running of a vehicle which deviates from a previously set state during lane change control from a first lane to a second lane.

A first aspect of the disclosure provides an automatic driving system that is mounted in a vehicle, including: an information acquiring device configured to acquire driving environment information indicating a driving environment of the vehicle; a running control device configured to execute lane change control from a first lane to a second lane during automatic driving of the vehicle based on the driving environment information; and a display device configured to display an upper limit value of a running speed of the vehicle which is set by a driver of the vehicle during the automatic driving. The running control device is configured to determine whether speed-deviation running in which the running speed is higher than the upper limit value is to be performed immediately before execution of the lane change control is started. The display device is configured to display a deviation value which is calculated based on a target value of the running speed and the upper limit value along with the upper limit value during the speed-deviation running when it is determined that the speed-deviation running is to be performed.

According to the first aspect, when it is determined that speed-deviation running is to be performed, an upper limit value of a running speed and a deviation value are presented to a driver via the display device. Accordingly, a driver can be informed that the speed-deviation running is not based on an abnormality in a system but is being intentionally performed by the system. As a result, it is possible to lessen the driver's feeling of uneasiness due to the speed-deviation running.

In the first aspect, the display device may be further configured to display a set value of an inter-vehicle distance which is set by the driver, the running control device may be further configured to determine whether distance-deviation running in which the inter-vehicle distance is less than the set value is to be performed immediately before execution of the lane change control is started, and the display device may be further configured to display a deviation value which is calculated based on a predicted value of the inter-vehicle distance and the set value along with the set value during the distance-deviation running when it is determined that the distance-deviation running is to be performed.

According to the above configuration, when it is determined that distance-deviation running is to be performed, a set value of an inter-vehicle distance and a deviation value are presented to a driver via the display device. Accordingly, it is possible to prevent a driver from feeling uneasy due to the distance-deviation running.

A second aspect of the disclosure provides an automatic driving system that is mounted in a vehicle, including: an information acquiring device configured to acquire driving environment information indicating a driving environment of the vehicle; a running control device configured to execute lane change control from a first lane to a second lane during automatic driving of the vehicle based on the driving environment information; and a display device configured to display, during the automatic driving, a set value of an inter-vehicle distance which is set by a driver of the vehicle. The running control device is configured to determine whether distance-deviation running in which the inter-vehicle distance is less than the set value is to be performed immediately before execution of the lane change control is started. The display device is configured to display a deviation value which is calculated based on a predicted value of the inter-vehicle distance and the set value along with the set value during the distance-deviation running when it is determined that the distance-deviation running is to be performed.

According to the second aspect, when it is determined that distance-deviation running is to be performed, a set value of an inter-vehicle distance and a deviation value are delivered to a driver via the display device. Accordingly, it is possible to lessen the driver's feeling of uneasiness due to the deviation running.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION

Hereinafter, embodiments of the disclosure will be described with reference to the accompanying drawings. When numerical values such as numbers, numerals, amounts, and ranges of elements are mentioned in the following embodiment, the disclosure is not limited to the mentioned numerical values unless mentioned explicitly or unless the numerical values are clearly restrictive in principle. Structures, steps, or the like which will be described in the following embodiment are not essential for the disclosure unless mentioned explicitly or unless apparently restrictive in principle.

First Embodiment

A first embodiment of the disclosure will be described below with reference to FIGS. 1 to 15.

1. Configuration of Automatic Driving System

An automatic driving system according to the first embodiment is mounted in a vehicle and controls automatic driving of the vehicle. A vehicle in which this system is mounted (hereinafter also referred to as a "vehicle M1") is, for example, a vehicle using an internal combustion engine such as a diesel engine or a gasoline engine as a power source, an electric vehicle using an electric motor as a power source, or a hybrid vehicle including an internal combustion engine and an electric motor. The electric motor is driven by a battery such as a secondary battery, a hydrogen fuel cell, a metal fuel cell, or an alcohol fuel cell.

Figure 1:
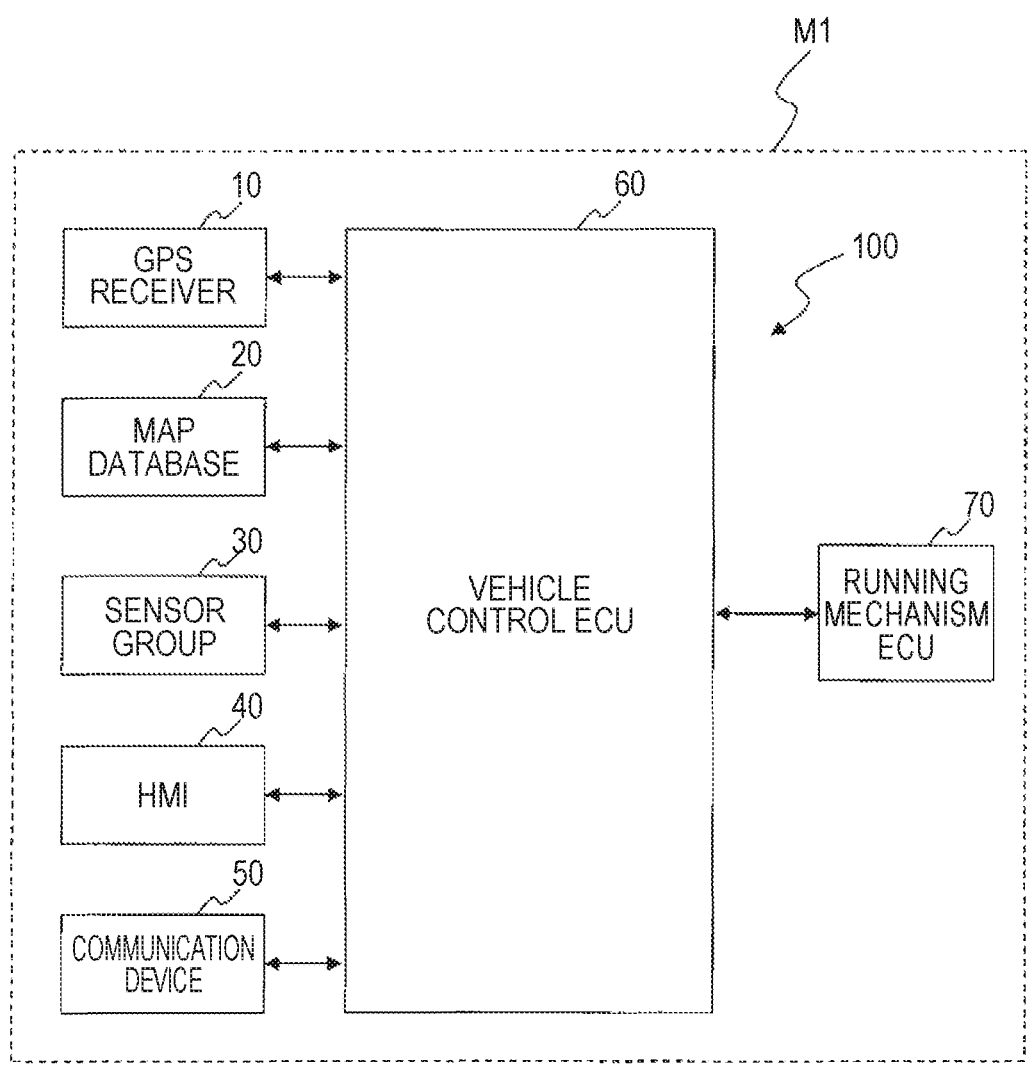
FIG. 1 is a block diagram illustrating an example of a configuration of an automatic driving system according to embodiments of the disclosure.

FIG. 1 is a block diagram illustrating an example of a configuration of the automatic driving system according to the first embodiment. The automatic driving system 100 illustrated in FIG. 1 includes a Global Positioning System (GPS) receiver 10, a map database 20, a sensor group 30, a Human-Machine Interface (HMI) unit 40, and a communication device 50. The automatic driving system 100 further includes a vehicle control electronic control unit (hereinafter also referred to as a "vehicle control ECU") 60 and a running mechanism electronic control unit (hereinafter also referred to as a "running mechanism ECU") 70.

The GPS receiver 10 is a device that receives signals from three or more GPS satellites. The GPS receiver 10 calculates a position and an orientation (a direction) of the vehicle M1 based on the received signals. The GPS receiver 10 transmits the calculated information (hereinafter also referred to as "position and orientation information") to the vehicle control ECU 60.

Data of map information is stored in the map database 20. The data of map information includes data of positions of roads, intersections, merging junctions, branching junctions, and the like, data of road shapes (for example, a curve, a type of a straight line, a road width, and a road gradient), data of road types (for example, an expressway and a toll road), and data of boundary positions of each lane (a boundary position is expressed, for example, by a set of a plurality of points or a plurality of lines). The map database 20 is stored in a predetermined storage device (such as a hard disk or a flash memory).

The sensor group 30 includes an external sensor that detects conditions around the vehicle M1. Examples of the external sensor include a Laser imaging Detection and Ranging (LIDAR), a radar, a camera, and a luminance sensor. The LIDAR detects an object around the vehicle M1 using light. The radar detects an object around the vehicle M1 using radiowaves. The camera images the conditions around the vehicle M1. The luminance sensor detects the luminance at the position of the vehicle M1. The external sensor transmits the detection information (hereinafter also referred to as "external sensor information") to the vehicle control ECU 60.

The sensor group 30 includes an internal sensor that detects a running state of the vehicle M1. Examples of the internal sensor include a vehicle speed sensor, a brake sensor, an accelerator operation sensor, and a steering angle sensor. The vehicle speed sensor detects a running speed of the vehicle M1 (hereinafter also referred to as a "vehicle speed VM1"). The brake sensor detects an amount of depression of a brake pedal by a driver. The accelerator operation sensor detects an amount of depression of an accelerator pedal by a driver. The steering angle sensor detects a rotation angle (a steering angle) of a steering wheel. The internal sensor transmits the detected information (hereinafter also referred to as "internal sensor information") to the vehicle control ECU 60.

The HMI unit 40 is an interface that provides information to a driver and receives information from a driver. For example, the HMI unit 40 includes an input device, a display device, a speaker, and a microphone. Examples of the input device include a touch panel, a keyboard, a switch, and buttons. Examples of the display device include a head-up display (HUD), a display of a navigation system, and a combination meter. The HMI unit 40 transmits information input by a driver (hereinafter also referred to as "driver information") to the vehicle control ECU 60.

The communication device 50 performs V2X communication. Specifically, the communication device 50 performs V2V communication (vehicle-to-vehicle communication) with another vehicle. The communication device 50 performs V2I communication (road-to-vehicle communication) with neighboring infrastructure. The communication device 50 can acquire information on an environment around the vehicle M1 by V2X communication. The communication device 50 transmits the acquired information (hereinafter also referred to as "communication information") to the vehicle control ECU 60.

The vehicle control ECU 60 executes automatic driving control for controlling automatic driving of the vehicle M1. Typically, the vehicle control ECU 60 is a microcomputer including a processor, a memory, and an input and output interface. The vehicle control ECU 60 receives a variety of information via the input and output interface. The vehicle control ECU 60 executes automatic driving control based on the received information. Specifically, the vehicle control ECU 60 makes a running plan of the vehicle M1 and outputs information to the running mechanism ECU 70 such that the vehicle M1 runs in accordance with the running plan.

The running mechanism ECU 70 is a microcomputer having the same configuration as the vehicle control ECU 60. The running mechanism ECU 70 includes a plurality of ECUs. These ECUs control running mechanisms (not illustrated) of the vehicle M1 in accordance with information input from the vehicle control ECU 60. These running mechanisms are electronically controlled and include a running driving force output device, a steering device, and a brake device. The running driving force output device is a power source that generates a running driving force. The steering device turns vehicle wheels. The brake device generates a braking force.

2. Outline of Automatic Driving Control

Automatic driving control which is executed by the vehicle control ECU 60 includes tracking control and constant speed control. Tracking control is control for allowing the vehicle M1 to run while keeping a distance between the vehicle M1 and a preceding vehicle (hereinafter also referred to as an "inter-vehicle distance"). In tracking control, a time between the preceding vehicle and the vehicle M1 (an inter-vehicle time) may be kept constant instead of the inter-vehicle distance. Constant speed control is control for allowing the vehicle M1 to run at a constant speed when there is no preceding vehicle. The inter-vehicle distance (or the inter-vehicle time) in the tracking control is included in driver information. An upper limit value of a running speed in the tracking control and the constant speed control is also included in driver information.

The automatic driving control also includes LC control. LC control is control for changing a lane in which the vehicle M is running from a first lane to a second lane. In the following description, the first lane is also referred to as a "lane L1" and the second lane is also referred to as a "lane L2." In the first embodiment, LC control is executed during execution of the tracking control and the constant speed control.

The vehicle control ECU 60 determines whether LC control is to be executed during execution of tracking control and constant speed control. For example, the vehicle control ECU 60 recognizes branching or merging of lanes in front of the vehicle M1 based on position and orientation information and lane information. Alternatively, the vehicle control ECU 60 recognizes branching or merging of lanes based on external sensor information. In this case, the vehicle control ECU 60 determines that LC control is to be executed in a branching junction or a merging junction.

For example, the vehicle control ECU 60 recognizes an obstacle in front of the vehicle M1 based on external sensor information. Examples of an obstacle include a stopped vehicle, a low-speed running vehicle, and a fallen object. In this case, the vehicle control ECU 60 determines that LC control is to be executed in order to avoid the obstacle.

For example, the vehicle control ECU 60 recognizes a roadwork section or a vehicle involved in an accident in front of the vehicle M1 based on the position and orientation information and the received information. In this case, the vehicle control ECU 60 determines that LC control is to be executed in order to avoid the roadwork section or the vehicle involved in an accident.

2.1 Details of LC Control

Figure 2:
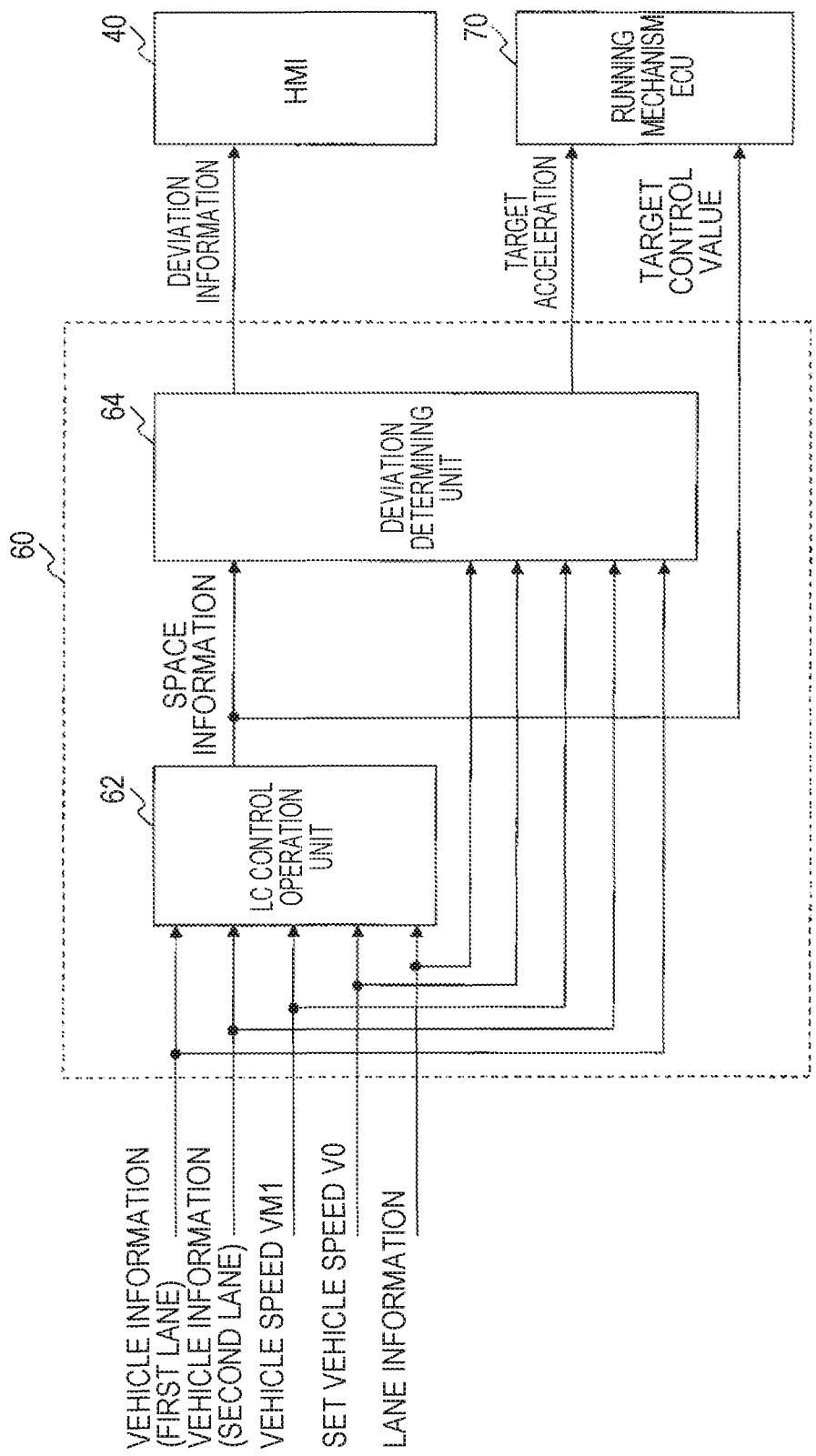
FIG. 2 is a control block diagram of lane change control.

FIG. 2 is a control block diagram of LC control. As illustrated in FIG. 2, the vehicle control ECU 60 includes an LC control operation unit 62 and a deviation determining unit 64 as functional blocks associated with LC control. These functional blocks are embodied by causing the processor of the vehicle control ECU 60 to execute a control program stored in the memory. The control program may be stored in a computer-readable recording medium.

(1) LC Control Operation Unit 62

When it is determined that LC control is to be executed, the LC control operation unit 62 performs a process of calculating a target control value which is required for the execution. A target control value refers to a target value of a control value of the running mechanism. The LC control operation unit 62 acquires driving environment information in operation processing. Driving environment information is information indicating a driving environment of the vehicle M1. Driving environment information includes vehicle information, running speed information, set speed information, and lane information.

The vehicle information is information on a vehicle (hereinafter also referred to as a "vehicle M2") around the vehicle M1. Examples of the vehicle M2 include a preceding vehicle in a lane L1 or a lane L2, a following vehicle in the lane L1 or the lane L2, and a vehicle running in parallel in the lane L2. The vehicle information is separately generated based on external sensor information. The vehicle information includes a position and a running speed of a vehicle M2. For the purpose of convenience of description, vehicle information in the lane L1 and vehicle information in the lane 12 are illustrated in FIG. 2.

The running speed information is information on a running speed (that is, a vehicle speed VM1) of the vehicle M1. The running speed information is separately generated based on internal sensor information.

The set speed information is information on an upper limit value of the running speed (hereinafter also referred to as a "set vehicle speed V0") of the vehicle M1 which is set by a driver. The set speed information is separately generated based on driver information.

The lane information is information on lanes around the vehicle M1. The lane information is separately generated based on position and orientation information, map information, external sensor information, and communication information. The lane information includes position, shape, and gradient of each lane.

In an arithmetic operation process, the LC control operation unit 62 generates space information. Space information is generated based on the vehicle information (more exactly, vehicle information in the lane L2) acquired by the LC control operation unit 62. The space information includes a moving speed VS of a space SP and a predetermined position PP in the space SP.

A space SP is basically formed between two vehicles M2 adjacent to each other in a front-rear direction (which means a longitudinal direction of a lane, which is the same in the following description). When another vehicle M2 is not detected in front of the vehicle M2, a space SP is formed in front of the vehicle M2. This is the same when another vehicle M2 is not detected behind the vehicle M2. The moving speed VS is expressed by a running speed of a vehicle M2 on the rear side out of two vehicles M2 forming the space SP of interest. The moving speed VS may be expressed by an average value of the running speeds of the two vehicles M2. The predetermined position PP is set with respect to the positions of the two vehicles M2. The predetermined position PP is set to, for example, a position several meters before the position of the vehicle M2 on the rear side.

Figure 3:
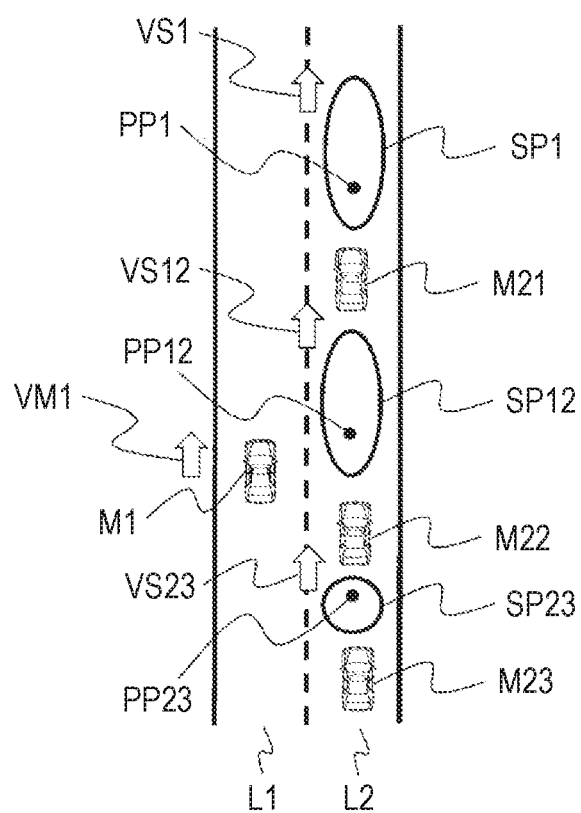
FIG. 3 is a diagram illustrating an example of a space SP.

FIG. 3 is a diagram illustrating an example of the space SP. In the example illustrated in FIG. 3, spaces SP1, SP12, and SP23 are illustrated. All of a vehicle M21, a vehicle M22, and a vehicle M23 are the vehicles M2. The space SP1 is formed in front of the vehicle M21. Another vehicle M2 in front of the vehicle M21 is not detected. The space SP12 is formed between the vehicle M21 and the vehicle M22. The space SP23 is formed between the vehicle M22 and the vehicle M23. Another vehicle M2 behind the vehicle M23 is not detected. A predetermined position PP is set with respect to the position of the vehicle M21, a predetermined position PP12 is set with respect to the position of the vehicle M22, and a predetermined position PP23 is set with respect to the position of the vehicle M23.

Description of the LC control operation unit 62 will be continued with reference back to FIG. 2. After space information has been generated, the LC control operation unit 62 sets a target position TPP. The target position TPP is a predetermined position PP in a space SP which is selected as a target space TSP. The target space TSP will be described later. After the target position TPP has been set, the LC control operation unit 62 calculates a target control value based on the target position TPP and driving environment information. The target control value is, for example, a target steering torque for causing the vehicle M1 to run along a locus connecting the current position of the vehicle M1 to the target position TPP. The target control value is sent to the running mechanism ECU 70.

(2) Deviation Determining Unit 64

The deviation determining unit 64 performs a deviation determining process. The deviation determining process is a process of determining whether deviation running control is to be executed before LC control is executed. Details of the deviation determining process will be described later. The deviation determining unit 64 performs deviation running control based on the result of the deviation determining process. The deviation running control is control for causing the vehicle M1 to run at a speed higher than a set vehicle speed V0. When deviation running control is executed, the running speed of the vehicle M1 is temporarily higher than the set vehicle speed V0 immediately before execution of LC control is started. When the deviation running control is executed, the deviation determining unit 64 calculates target acceleration of the vehicle M1. The target acceleration is sent to the running mechanism ECU 70.

2.2 Processing Example in LC Control

Figure 4:
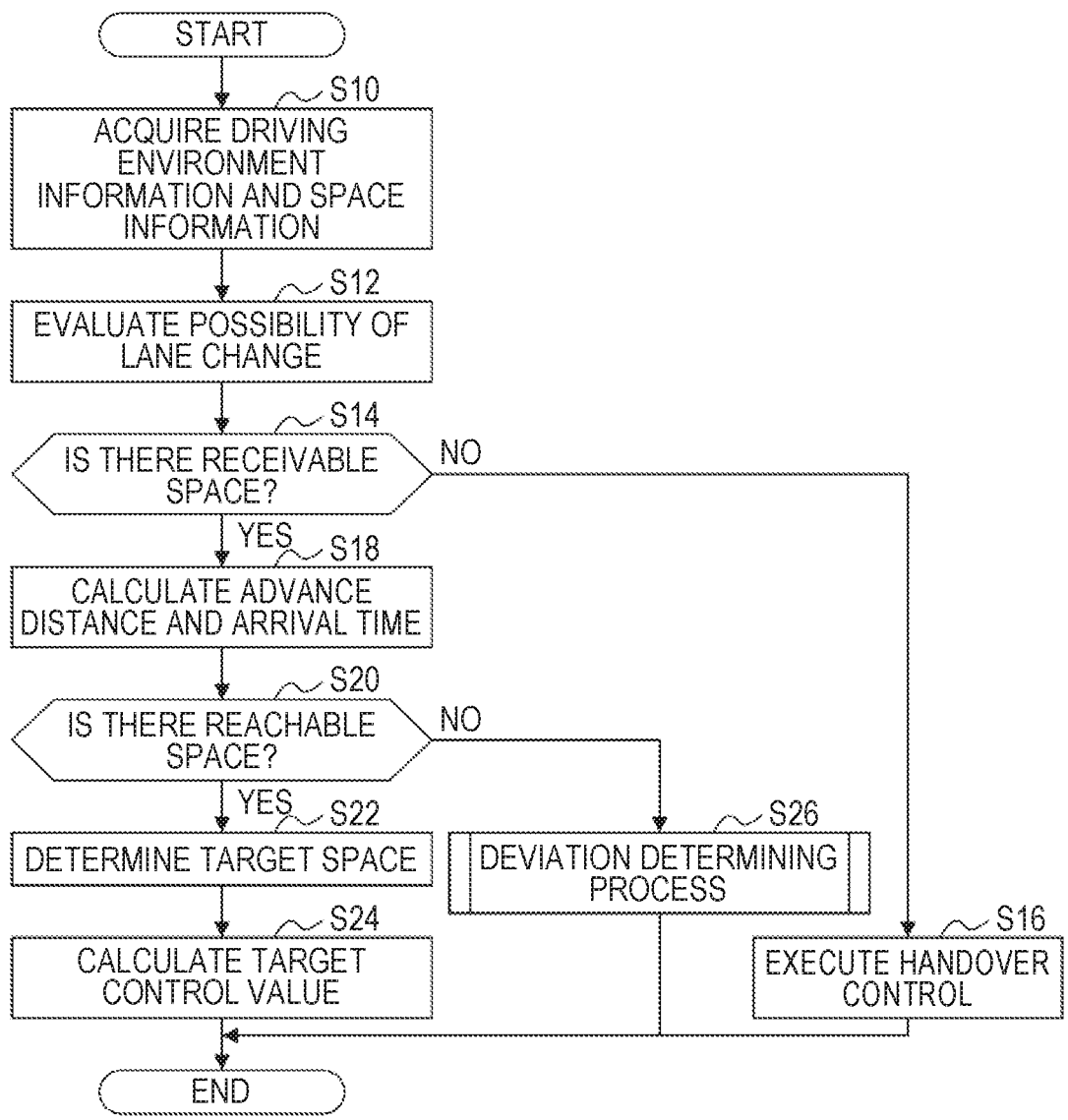
FIG. 4 is a flowchart illustrating a flow of an LC control process.
Figure 5:
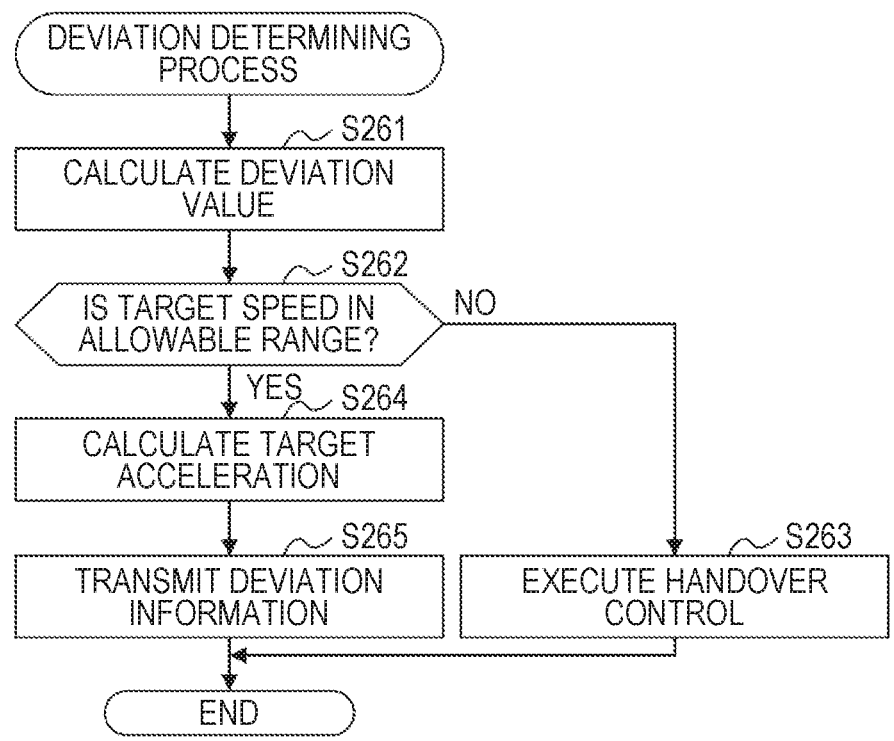
FIG. 5 is a flowchart illustrating a flow of a deviation determining process.

FIGS. 4 and 5 are flowcharts illustrating a process flow when the vehicle control ECU 60 executes LC control. In the routine illustrated in FIG. 4, first, driving environment information and space information are acquired (Step S10). The driving environment information acquired in this step is information which is required for calculating the target control value such as vehicle information, running speed information, set speed information, and lane information. The space information acquired in this step is information which is generated based on the vehicle information in the lane L2.

Figure 6:
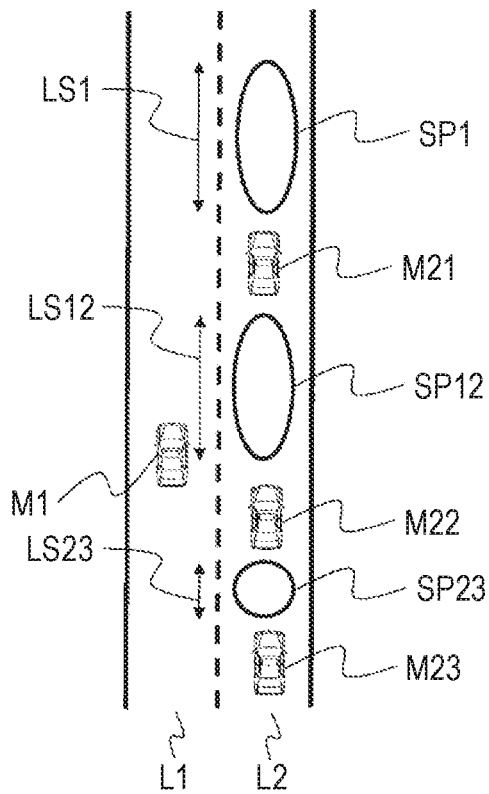
FIG. 6 is a diagram illustrating an evaluation process of Step S12 in FIG. 4.

Subsequently to Step S10, possibility of lane change is evaluated (Step S12). Evaluation of possibility is performed based on the information acquired in Step S10. FIG. 6 is a diagram illustrating the evaluation process of Step S12. In FIG. 6, similarly to FIG. 3, spaces SP1, SP12, and SP23 are illustrated. In FIG. 6, lengths LS in the front-rear direction of the spaces SP are illustrated. The lengths LS are calculated based on the space information. In the evaluation process, whether each space SP of which the length LS is calculated can receive lane change of the vehicle M1 is evaluated.

In the evaluation process, the length LS of the space SP of interest is compared with a threshold value THL. The threshold value THL is a value obtained by adding a predetermined margin to the total length of the vehicle M1. This margin may be set to be variable depending on the vehicle speed VM1. In the evaluation process, when the length LS of the space SP of interest is less than the threshold value THL, it is evaluated that the space SP cannot receive the vehicle M1. On the other hand, when the length LS of the space SP of interest is greater than the threshold value THL, the space SP can receive the vehicle M1.

Description of the process flow of LC control will be continued with reference back to FIG. 4. Subsequently to Step S12, whether there is a space SP that can receive lane change of the vehicle M1 (Step S14) is determined. The determination process of this step is performed based on the evaluation result of Step S12. When it is determined that there is no space SP that can receive lane change, handover control is executed (Step S16). Handover control is control for realizing manual lane change. In the handover control, for example, a driver's intervention in driving is requested via the HMI unit 40. In the handover control, target deceleration for causing the vehicle M1 to run at a lower speed may be calculated and sent to the running mechanism ECU 70.

When the determination result of Step S14 is positive, an advance distance DP and an arrival time tP are calculated (Step S18). An advance distance DP is a distance in the front-rear direction to the position PPL1 on one side of the space SP. The advance distance DP is calculated as a distance between the position PPL1 and the current position of the vehicle M1. The position PPL1 is a position in the lane L1 which is the same position in the lateral direction as a predetermined position PP. When the predetermined position PP is set, the position PPL1 is identified.

The arrival time tP is a time at which the vehicle M1 is predicted to arrive at the position PPL1. The arrival time tP is calculated based on the advance distance DP and the running speed of the vehicle M1. The arrival time tP is calculated on the assumption that the running speed of the vehicle M1 is a vehicle speed VM1±α. Accordingly, a margin is given to the arrival time tP. The speed margin α is a fixed value. Here, the speed margin α may be set to be variable depending on the vehicle speed VM1. When the vehicle speed VM1+α is greater than the set vehicle speed V0, the vehicle speed VM1±α is set to the same speed as the set vehicle speed V0.

Subsequently to Step S18, whether there is a space SP at which the vehicle M1 can arrive (Step S20) is determined. The determination process of Step S20 includes an arrival determining process and a constraint determining process. These processes will be described below.

(1) Arrival Determining Process

Figure 7:
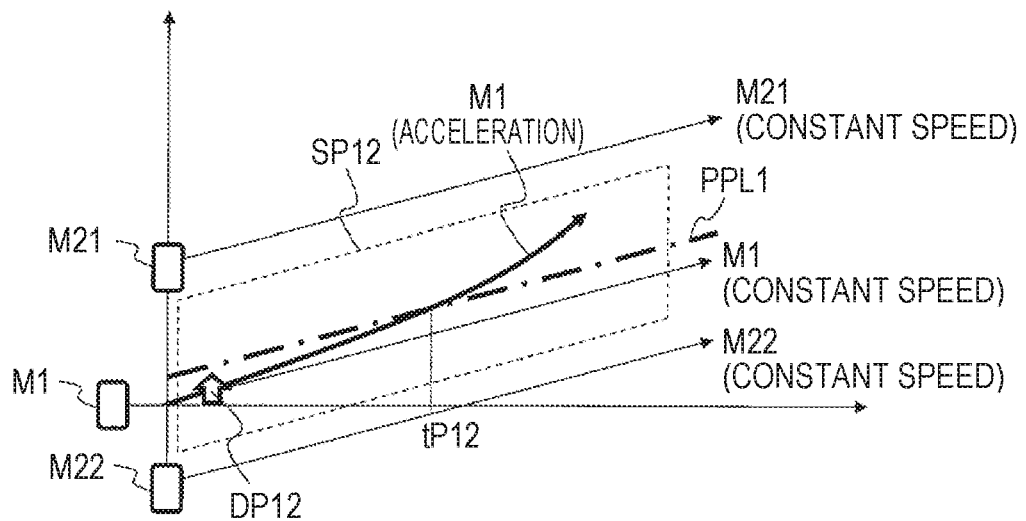
FIG. 7 is a diagram illustrating an arrival determining process.
Figure 8:
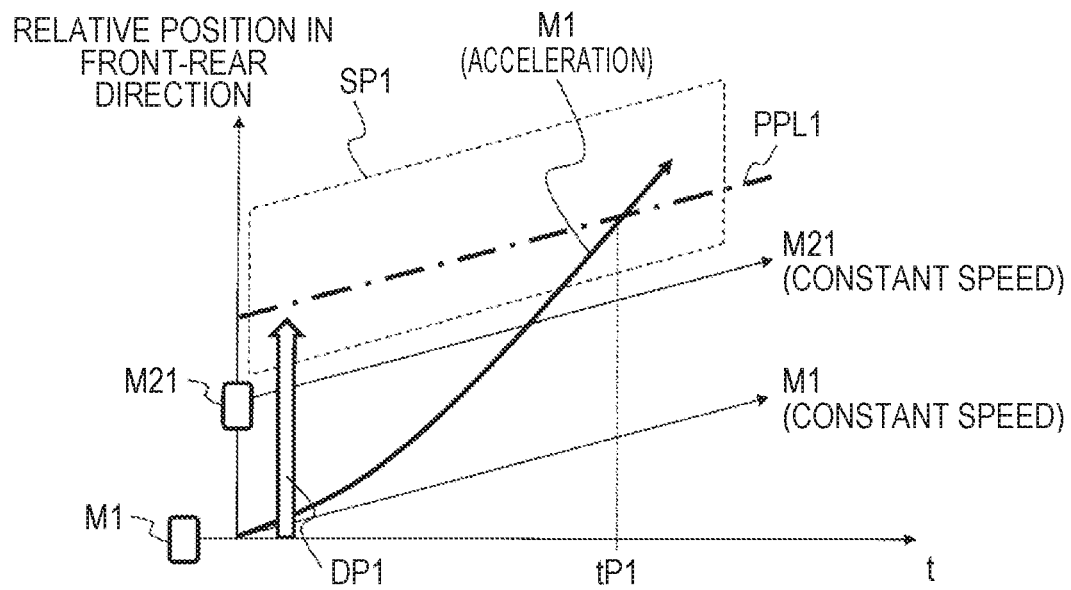
FIG. 8 is a diagram illustrating an arrival determining process.
Figure 9:
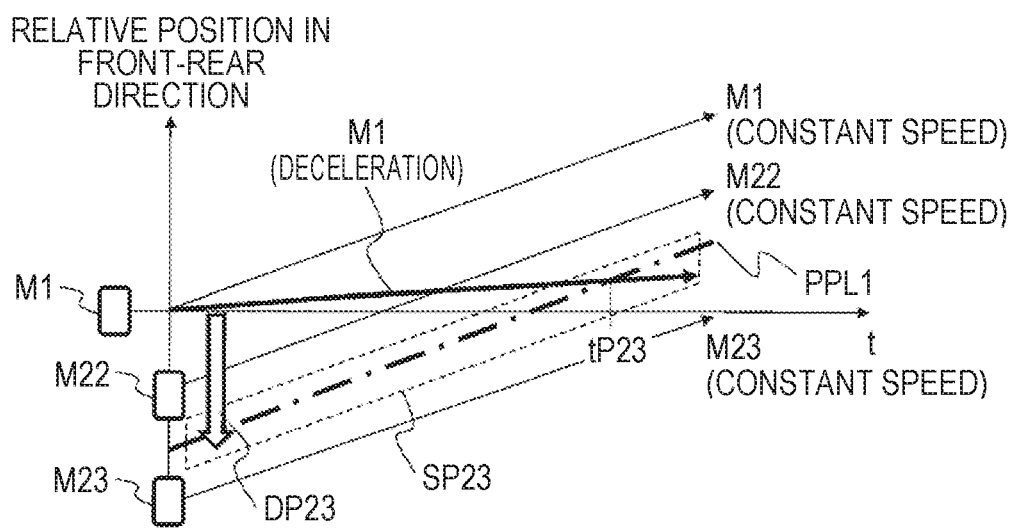
FIG. 9 is a diagram illustrating an arrival determining process.

The arrival determining process is a process of determining whether the vehicle M1 can arrive at the position PPL1 based on the running speed. FIGS. 7 to 9 are diagrams illustrating the arrival determining process. FIGS. 7 to 9 are different from each other in a space SP which is a determination target. That is, the determination target in FIG. 7 is the space SP12 illustrated in FIGS. 3 and 6. The determination target in FIG. 8 is the space SP1. The determination target in FIG. 9 is the space SP23. For the purpose of convenience of description, it is assumed that all the spaces SP1, SP12, and SP23 can receive the vehicle M1 in FIGS. 7 to 9. In FIGS. 7 to 9, it is also assumed that only the running speed of the vehicle M1 changes and the running speeds of the vehicles M21 to M23 do not change.

In FIG. 7, the vertical axis represents a relative position in the front-rear direction and the horizontal axis represents an elapsed time from the current time. The position PPL1 is located in front of the vehicle M1. The space SP12 moves forward with the lapse of time. Accordingly, when the vehicle M1 runs at the same speed as the space SP12, the vehicle M1 cannot arrive at the position PPL1. When the vehicle M1 is intended to arrive at the position PPL1, it is necessary to cause the vehicle M1 to accelerate. An advance distance DP12 is a distance in the front-rear direction from the current position of the vehicle M1 to the position PPL1. An arrival time tP12 is a time at which a running locus of the vehicle M1 at the time of acceleration and a movement locus of the position PPL1 cross each other. The upper-limit speed at the time of acceleration is the vehicle speed VM1±α.

Similarly to FIG. 7, the position PPL1 illustrated in FIG. 8 is located in front of the vehicle M1. Accordingly, when the vehicle M1 runs at the same speed as the space SP1, the vehicle M1 cannot arrive at the position PPL1. When the vehicle M1 is intended to arrive at the position PPL1, it is necessary to cause the vehicle M1 to accelerate. An advance distance DP1 is a distance in the front-rear direction from the current position of the vehicle M1 to the position PPL1. An arrival time tP1 is a time at which a running locus of the vehicle M1 at the time of acceleration and a movement locus of the position PPL1 cross each other.

On the other hand, the position PPL1 illustrated in FIG. 9 is located behind the vehicle M1. Accordingly, when the vehicle M1 runs at the same speed as the space SP23, the vehicle M1 cannot arrive at the position PPL1. When the vehicle M1 is intended to arrive at the position PPL1, it is necessary to cause the vehicle M1 to decelerate. An advance distance DP23 is a distance in the front-rear direction from the current position of the vehicle M1 to the position PPL1. An arrival time tP23 is a time at which a running locus of the vehicle M1 at the time of acceleration and a movement locus of the position PPL1 cross each other.

In FIGS. 7 to 9, it is based on the premise that the running speeds of the vehicle M1 and the vehicles M21 to M23 are substantially the same. Accordingly, the arrival time tP is calculated by changing the running speed of the vehicle M1. However, actually, the running speeds of the vehicle M1 and the vehicles M21 to M23 are different. The arrival determining process in this case will be described below with reference to FIG. 10.

Figure 10:
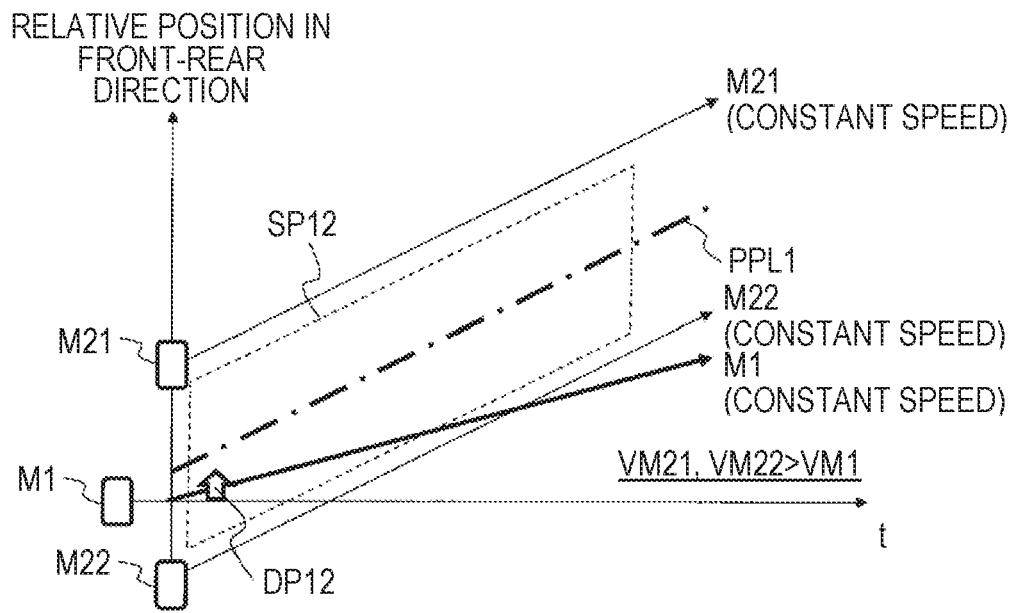
FIG. 10 is a diagram illustrating an arrival determining process.

The determination target in FIG. 10 is the space SP12. In FIG. 10, similarly to FIG. 7, the position PPL1 is located in front of the vehicle M1. Accordingly, when the vehicle M1 runs at the same speed as the space SP12, the vehicle M1 cannot arrive at the position PPL1. When the vehicle M1 is intended to arrive at the position PPL1, it is necessary to cause the vehicle M1 to accelerate and run. However, in FIG. 10, the vehicles M21 and the M22 run at higher speeds than the vehicle M1. Accordingly, the distance between the vehicle M1 and the position PPL1 does not decrease at all. In addition, the relative position between the vehicle M1 and the vehicle M22 is reversed.

In the arrival determining process, a moving speed VS of the space SP is compared with the upper-limit speed (that is, the vehicle speed VM1±α) at the time of acceleration of the vehicle M1. When the moving speed VS is higher than the upper-limit speed, it is determined that the vehicle M1 cannot arrive at the position PPL1 on one side of the space SP which is the determination target. In FIG. 10, it is determined that the vehicle M1 cannot arrive at the position PPL1 on one side of the space SP12.

As described above, in the arrival determining process, comparison between the upper-limit speed and the moving speed VS is first performed. Subsequently, the spaces SP of which the moving speed VS is higher than the upper-limit speed is excluded. Then, the arrival time tP for the space SP of which the moving speed VS is lower than the upper-limit speed is calculated.

(2) Constraint Determining Process

Figure 11:
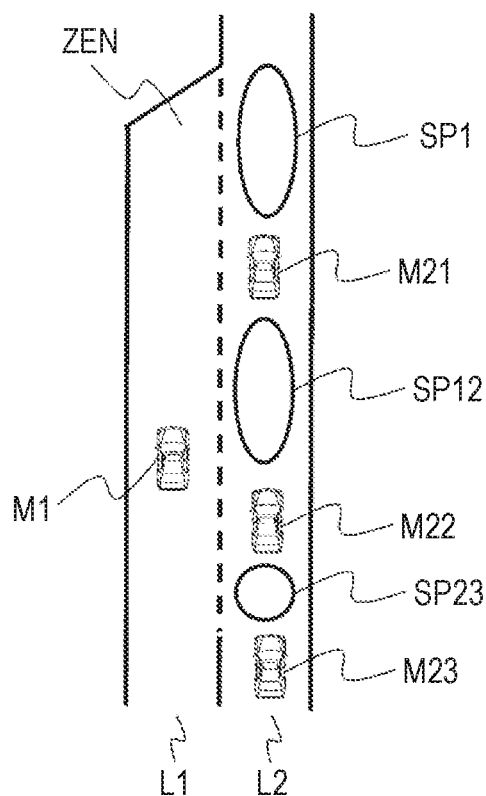
FIG. 11 is a diagram illustrating an example of a static constraint.

The constraint determining process is a process of determining whether the vehicle M1 can arrive at the position PPL1 based on static or dynamic constraints. FIG. 11 is a diagram illustrating an example of a static constraint. In FIG. 11, similarly to FIG. 6, the spaces SP1, SP12, and SP23 are illustrated. Here, the lane L1 illustrated in FIG. 11 is a merging lane. Accordingly, in this case, it is necessary to complete execution of LC control before the vehicle M1 arrives at a front end ZEN of the merging junction. This case is also applicable when LC control for avoiding an obstacle or a roadwork section in the lane L1 is executed.

Figure 12:
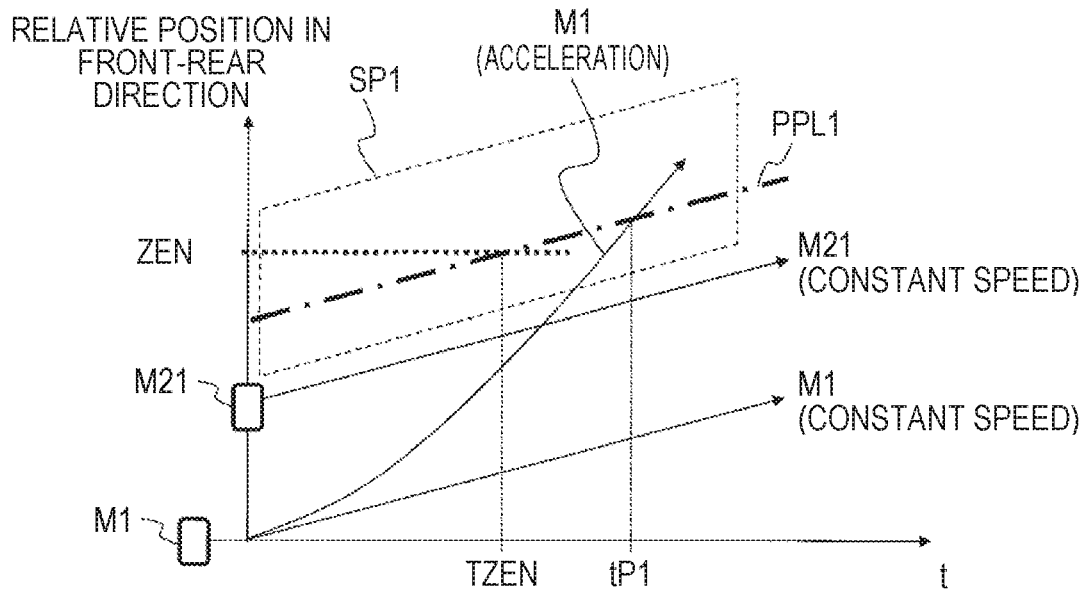
FIG. 12 is a diagram illustrating an example of a constraint determining process based on a static constraint.

FIG. 12 is a diagram illustrating an example of the constraint determining process based on a static constraint. The determination target in FIG. 12 is the space SP1. As can be understood from comparison between FIG. 8 and FIG. 12, a front end ZEN is illustrated in FIG. 12. The front end ZEN does not move and the distance between the position PPL1 and the front end ZEN decreases with the lapse of time. The time TZEN illustrated in FIG. 12 is a time at which the position PPL1 and the front end ZEN coincide with each other. The time TZEN is located closer to the current time than the arrival time tP1.

In the constraint determining process, a constraint time such as the time TZEN is compared with the arrival time tP. Then, when the constraint time is located closer to the current time than the arrival time tP, it is determined that the vehicle M1 cannot arrive at the position PPL1 on one side of the space SP which is the determination target. In FIG. 12, the time TZEN is located closer to the current time than the arrival time tP1. Accordingly, in this case, it is determined that the vehicle M1 cannot arrive at the position PPL1 on one side of the space SP1.

Figure 13:
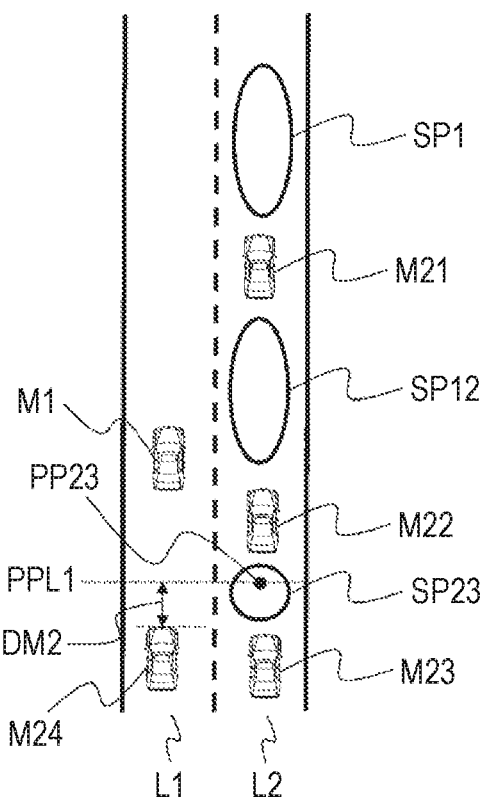
FIG. 13 is a diagram illustrating an example of a constraint determining process based on a dynamic constraint.

FIG. 13 is a diagram illustrating an example of the constraint determining process based on a dynamic constraint. In FIG. 13, similarly to FIG. 6, the spaces SP1, SP12, and SP23 are illustrated. Here, in FIG. 13, a vehicle M24 is present behind the vehicle M1. The vehicle M24 is a following vehicle in the lane L1. When the vehicle M24 is present, it is necessary to execute LC control while avoiding collision with the vehicle M24. This case is also applicable to LC control which is executed when a preceding vehicle is present in the lane L1.

In the constraint determining process, a distance DM2 from the position PPL1 to the following vehicle (or the preceding vehicle) is compared with a threshold value THD. The threshold value THD is a fixed value. Here, the threshold value THD may be set to be variable depending on the running speed of the following vehicle or the preceding vehicle. When the distance DM2 is less than the threshold value THD, it is determined that the vehicle M1 cannot arrive at the position PPL1 on one side of the space SP which is the determination target.

Description of the flow of the LC control process will be continued with reference back to FIG. 4. When the determination result of Step S20 is positive, the target space TSP is determined (Step S22). The target space TSP is selected from the spaces SP at which the vehicle M1 is determined to arrive in the determination process of Step S20. The method of selecting the target space TSP is not particularly limited and, for example, the space closest to the current position of the vehicle M is selected out of the spaces SP satisfying conditions.

Subsequently to Step S22, a target control value is calculated (Step S24). The target control value is, for example, a target steering torque or a target acceleration (or target deceleration) for causing the vehicle M1 to run along a locus connecting the current position of the vehicle M1 to a target position TPP. The target position TPP is a predetermined position PP in the target space TSP selected in Step S22.

When the target control value is calculated, the vehicle M moves along a locus connecting the current position thereof to the position PPL1 on one side of the target space TSP. Subsequently, the vehicle M1 moves along a locus connecting the position PPL1 to the target position TPP. When the vehicle M1 arrives at the target position TPP, the LC control ends.

2.3 Deviation Determining Process

When the determination result of Step S20 is negative, the deviation determining process is performed (Step S26). FIG. 5 is a flowchart illustrating a flow of the deviation determining process. In the routine illustrated in FIG. 5, first, a deviation value is calculated (Step S261). The deviation value is calculated based on a target speed VM1* of the vehicle M1 in the deviation running control.

Figure 14:
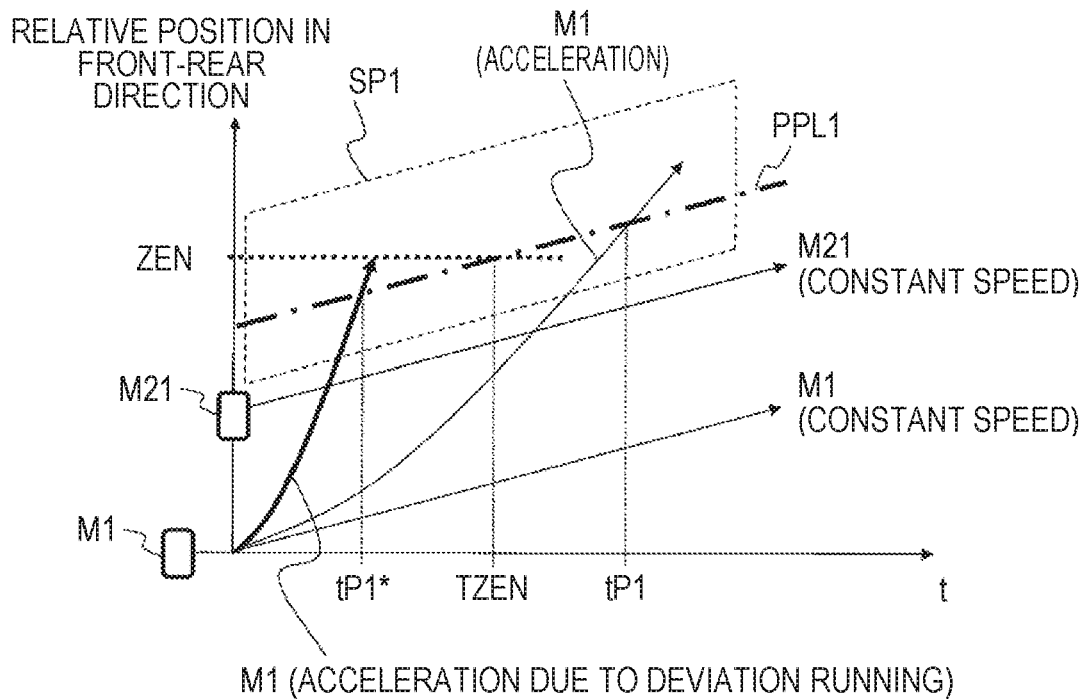
FIG. 14 is a diagram illustrating an example in which a deviation value is calculated.

A first target for which the deviation value is calculated is the space SP in which the arrival time tP has been calculated in the arrival determining process but at which it is determined for the vehicle M1 not to arrive because there is a static constraint in the constraint determining process. FIG. 14 is a diagram illustrating an example in which the deviation value is calculated. The determination target in FIG. 14 is the space SP1. The arrival time tP1 is an arrival time tP which is calculated in the arrival determining process. The arrival time tP1* is an arrival time tP when the target speed VM1* is set to a vehicle speed VM1±β. The speed margin β is set to a value greater than the speed margin α.

As illustrated in FIG. 14, the arrival time tP1* is located closer to the current time than the time TZEN. Here, as described above with FIG. 12, in the constraint determining process, it is determined that the vehicle M1 cannot arrive at the position PPL1 on one side of the space SP which is the determination target when a constraint time is located closer to the current time than the arrival time tP. Accordingly, in FIG. 14, by setting the target speed to the vehicle speed VM1±β, the arrival time tP can advance and thus the vehicle M1 can be allowed to arrive at the space SP1. The deviation value is calculated as a speed difference VM1−V0+β.

Figure 15:
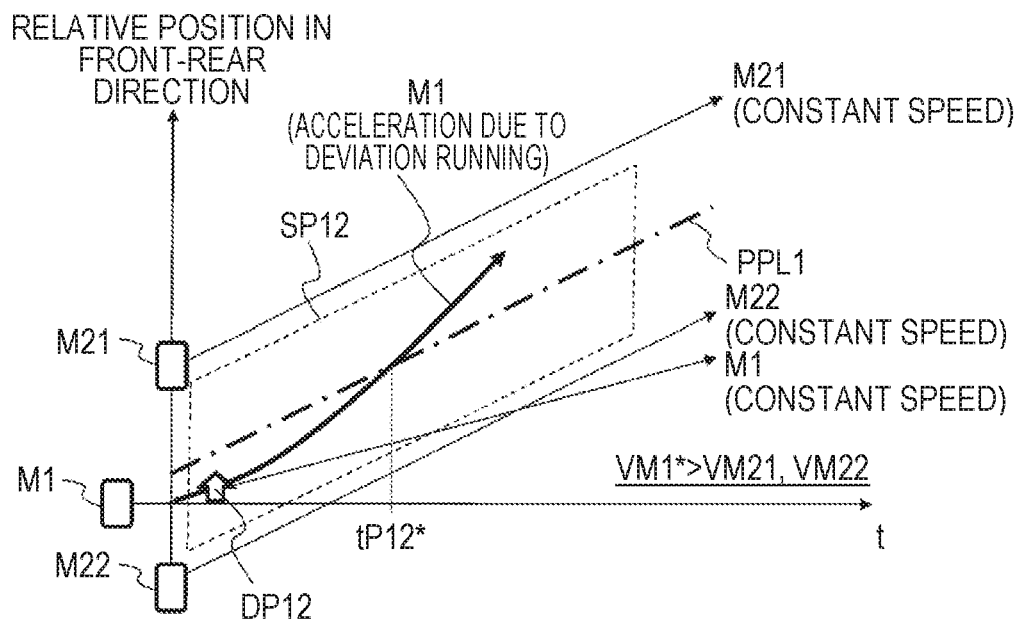
FIG. 15 is a diagram illustrating another example in which a deviation value is calculated.

A second target for which the deviation value is calculated is the space SP which is excluded in the arrival determining process. FIG. 15 is a diagram illustrating another example in which the deviation value is calculated. The determination target in FIG. 15 is the space SP12. The arrival time tP12* is an arrival time tP when the target speed VM1* is set to a vehicle speed VM1±γ. The speed margin γ is set to a value greater than the speed margin α.

As described above with reference to FIG. 10, in the arrival determining process, when the moving speed VS is higher than the upper-limit speed, it is determined that the vehicle M1 cannot arrive at the position PPL1 on one side of the space SP which is the determination target. Accordingly, in FIG. 15, by setting the target speed VM1* to the vehicle speed VM1±γ, the running speed of the vehicle M1 can increase and thus the arrival time tP can be calculated. The deviation value is calculated as a speed difference VM1−V0+γ.

When the deviation value for the space SP which is excluded in the arrival determining process is calculated, it is necessary to perform the constraint determining process after the arrival time tP has been calculated. In the constraint determining process, when it is determined that the vehicle M1 can arrive at the position on one side of the space SP, the speed difference VM1−V0+γ is provided to the process of Step S265. On the other hand, when it is determined that the vehicle M1 cannot arrive at the position on one side of the space SP due to a dynamic constraint, the speed difference is not provided to the process of Step S265.

When it is determined that the vehicle M1 cannot arrive at the position one side of the space SP due to a static constraint, the target speed VM1* is reset to a vehicle speed VM1±δ and update of the arrival time tP is considered. The speed margin δ is set to a value greater than the speed margin γ. That is, update of the arrival time tP is considered based on the same method as the method described above with reference to FIG. 14. When the arrival time tP is updated, the speed difference VM1−V0+δ is provided to the process of Step S265 as the deviation value.

Subsequently to Step S261, it is determined whether the target speed VM1* is in an allowable range (Step S262). An upper limit value of the allowable range is a designated speed which is designated as a running speed of the lanes L1 and L2 or a speed limit. The upper limit value is acquired from data of map information. The upper limit value may be acquired from communication information or external sensor information. When the target speed VM1* is greater than the upper limit value, handover control is executed (Step S263). The handover control is the same as described above in Step S16 of FIG. 4.

When the target speed VM1* is less than the upper limit value, target acceleration is calculated (Step S264). When the target acceleration is calculated, the position PPL1 is first identified. When there are a plurality of target speeds VM1* which are less than the upper limit value, one of a plurality of positions PPL1 is identified. The identification method is not particularly limited and, for example, one position closest to the current position of the vehicle M1 is selected from the positions PPL1 satisfying conditions. After the position PPL1 has been identified, the target acceleration is calculated.

Subsequently to Step S264, deviation information is transmitted (Step S265). The deviation information is the speed difference which is calculated in Step S261. When one is identified from the plurality of positions PPL1 in Step S264, the speed difference corresponding to the identified position PPL1 is transmitted as the deviation information.

Figure 16:
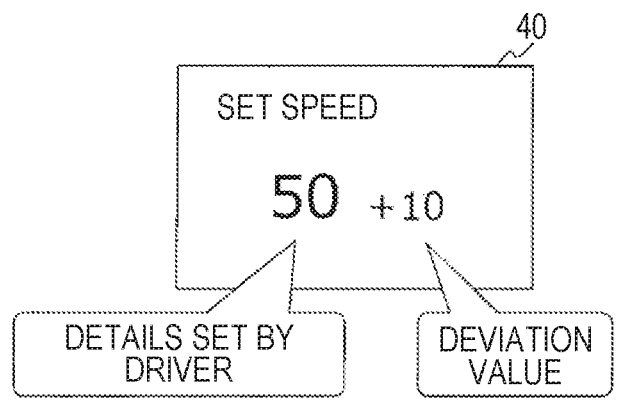
FIG. 16 is a diagram illustrating a display example of deviation information in an HMI unit.

FIG. 16 is a diagram illustrating a display example of the deviation information in the HMI unit 40. In the example illustrated in FIG. 16, the set vehicle speed V0 is 50 km/h. The deviation value is displayed on the right side of the set vehicle speed V0. In the example illustrated in FIG. 16, the deviation value is 10 km/h. That is, in the example illustrated in FIG. 16, the target speed VM1* is set to 60 km/h.

3. Advantages

In the system according to the first embodiment, when it is determined that there is no space SP at which the vehicle M1 can arrive in the LC control process, the deviation determining process is performed. In the deviation determining process, execution of LC control using deviation running is considered. When the LC control using deviation running is executed as the result of consideration, it is possible to cause the system to successfully execute automatic lane change.

In the system according to the first embodiment, when LC control using deviation running is executed, deviation information is presented to a driver via the HMI unit 40. Accordingly, the driver can be informed that the LC control using deviation running is not based on an abnormality in the system but is being intentionally executed by the system. As a result, it is possible to give a feeling of easiness to the driver and to successfully perform automatic lane change.

In the first embodiment, the GPS receiver 10, the map database 20, the sensor group 30, the input device of the HMI unit 40, and the communication device 50 are an example of an "information acquiring device," the vehicle control ECU 60 and the running mechanism ECU 70 are an example of a "running control device," the display device of the HMI unit 40 is an example of a "display device," the set vehicle speed V0 is an example of an "upper limit value of a running speed," and the target speed VM1* is an example of a "target value of a running speed."

Second Embodiment

A second embodiment of the disclosure will be described below with reference to FIGS. 17 to 19. In the following description, differences from the first embodiment will be mainly described and the same elements as in the first embodiment will be appropriately omitted.

1. Features of Automatic Driving System According to Second Embodiment

In the first embodiment, control in which the vehicle M1 is caused to run at a speed higher than the upper limit value (that is, the set vehicle speed V0) of the running speed which is set by a driver is defined as deviation running control. In the second embodiment, control in which the vehicle M1 is caused to run at an inter-vehicle distance less than an inter-vehicle distance set by a driver (hereinafter also referred to as a "set inter-vehicle distance D0") is defined as deviation running control in addition to the deviation running control based on the set vehicle speed V0. In the following description, deviation-running control based on the set vehicle speed V0 is also referred to as "first control" and deviation-running control based on the set inter-vehicle distance D0 is referred to as "second control."

In the first embodiment, the driving environment information acquired by the LC control operation unit 62 includes vehicle information, running speed information, set speed information, and lane information. In the second embodiment, the driving environment information further includes set inter-vehicle distance information. The set inter-vehicle distance information is information on the set inter-vehicle distance D0. The set inter-vehicle distance information is separately generated based on driver information.

In the second embodiment, the deviation determining unit 64 performs a deviation determining process and executes first control based on the result thereof. The deviation determining unit 64 performs a deviation determining process for executing second control (hereinafter also referred to as a "second deviation determining process"). The deviation determining unit 64 performs second control based on the result of the second deviation determining process. When the second control is executed, the inter-vehicle distance is temporarily less than the set inter-vehicle distance D0 immediately before execution of LC control is started.

2. Processing Example in LC Control

The process flow when the vehicle control ECU 60 executes LC control is basically the same as described above with reference to FIGS. 4 and 5. In the second embodiment, the second deviation determining process is performed subsequently to the process of Step S24 of FIG. 4 or the process of Step S265 of FIG. 5.

Figure 17:
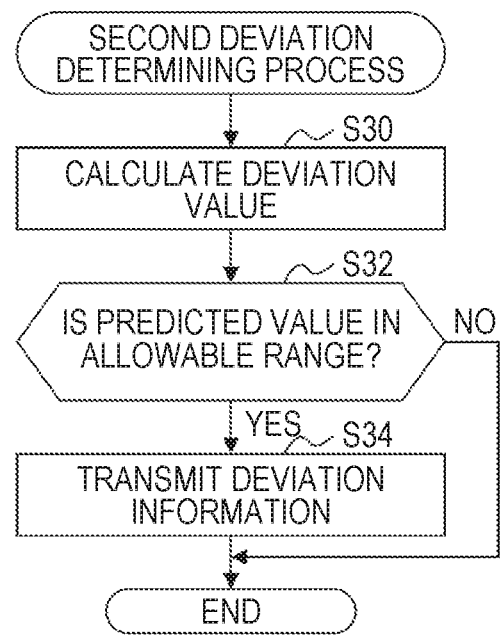
FIG. 17 is a flowchart illustrating a flow of a second deviation determining process.

FIG. 17 is a flowchart illustrating a flow of the second deviation determining process. In the routine illustrated in FIG. 17, first, a deviation value is calculated (Step S30). The deviation value is calculated based on a predicted value D* of the inter-vehicle distance in deviation running control.

When the deviation value is calculated subsequently to the process of Step S24 of FIG. 4, the calculation target is the target space TSP. When the deviation value is calculated subsequently to the process of Step S265 of FIG. 5, the calculation target is the space SP corresponding to the position PPL1 which is identified in Step S264.

Figure 18:
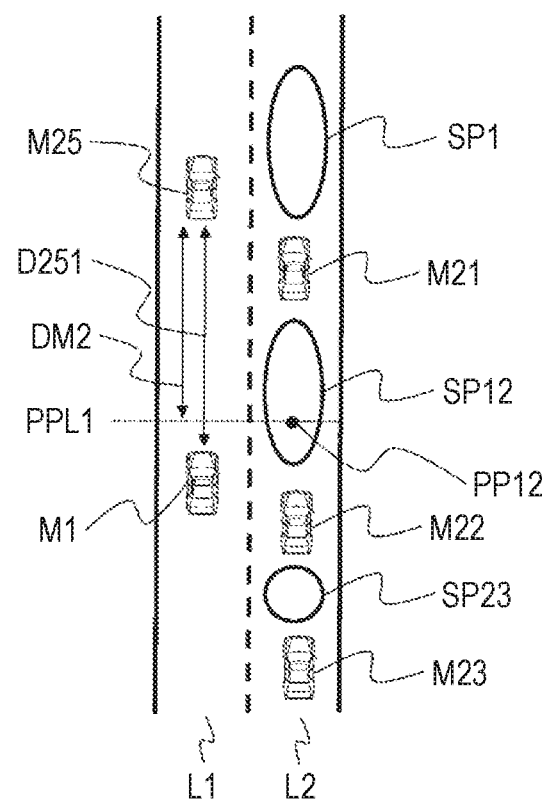
FIG. 18 is a diagram illustrating an example in which a deviation value is calculated.

FIG. 18 is a diagram illustrating an example in which a deviation value is calculated. In FIG. 18, similarly to FIG. 6, the spaces SP1, SP12, and SP23 are illustrated. In FIG. 18, a vehicle M25 is present in front of the vehicle M1. The vehicle M25 is a preceding vehicle in the lane L1.

The calculation target of the deviation value in FIG. 18 is the space SP12. In this case, the predicted value D* is a distance DM2 from the position PPL1 to the vehicle M25. The deviation value is calculated as a distance difference DM2−D0 between the distance DM2 and the set inter-vehicle distance D0.

For example, when tracking control with the vehicle M25 as a tracking object is executed, a distance D251 from the vehicle M1 to the vehicle M25 is kept at the set inter-vehicle distance D0. In this case, decreasing of the distance D251 to the distance DM2 is the same as deviation running (second deviation running) in which the vehicle deviates to be less than the set inter-vehicle distance D0.

Subsequently to Step S30, whether the predicted value D* is in an allowable range (Step S32) is determined. The lower limit value of the allowable range is a value obtained by adding a predetermined margin to a time-to-collision TTC. The margin may be set to be variable depending on the vehicle speed VM1. The lower limit value is calculated based on external sensor information and internal sensor information. When the predicted value D* is less than the lower limit value, the second deviation determining process ends.

When the predicted value D* is greater than the lower limit value, deviation information is transmitted (Step S34). The deviation information is the distance difference which is calculated in Step S30. Instead of the distance difference, a deviation rate which is obtained by dividing the distance difference by the set inter-vehicle distance D0 may be transmitted as the deviation information.

Figure 19:
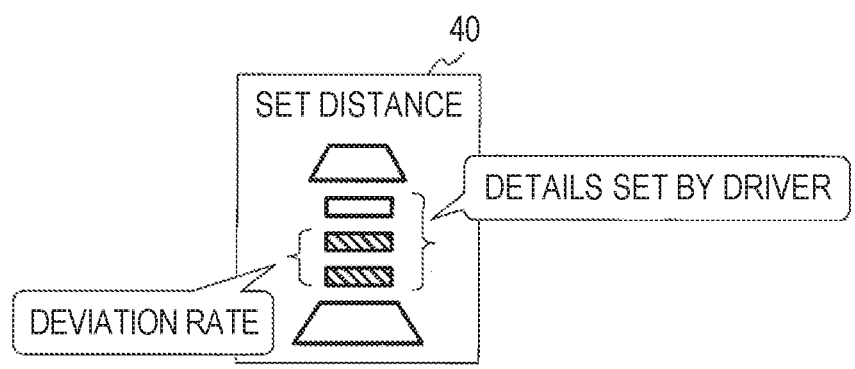
FIG. 19 is a diagram illustrating a display example of deviation information in an HMI unit.

FIG. 19 is a diagram illustrating a display example of deviation information in the HMI unit 40. In the example illustrated in FIG. 19, the deviation value is displayed based on gradation of three horizontal lines which are arranged in the vertical direction. When the inter-vehicle distance is not greater than the set inter-vehicle distance D0, three horizontal lines are displayed in light color. On the other hand, when the inter-vehicle distance is greater than the set inter-vehicle distance D0, the horizontal lines are displayed in dark color sequentially from the lower end depending on the deviation rate. In the example illustrated in FIG. 19, the horizontal lines at the lower end and the middle are displayed in dark color. The display example illustrated in FIG. 19 is only an example and the distance difference may be displayed instead of the deviation rate.

3. Advantages

In the system according to the second embodiment, when LC control using deviation running is executed, deviation information is presented to a driver via the HMI unit 40. Accordingly, it is possible to give a feeling of easiness to the driver and to successfully perform automatic lane change.

In the second embodiment, the display device of the HMI unit 40 is an example of a "display device," the set inter-vehicle distance D0 is an example of a "set value of an inter-vehicle distance," and the predicted value D* is an example of a "predicted value of an inter-vehicle distance." In the second embodiment, the GPS receiver 10, the map database 20, the sensor group 30, the input device of the HMI unit 40, and the communication device 50 are an example of an "information acquiring device" and the vehicle control ECU 60 and the running mechanism ECU 70 are an example of a "running control device."

What is claimed is:

1. An automatic driving system that is mounted in a vehicle, comprising:
    an information acquiring device configured to acquire driving environment information indicating a driving environment of the vehicle;
    a running control device configured to execute lane change control from a first lane to a second lane during automatic driving of the vehicle based on the driving environment information; and
    a display device configured to display an upper limit value of a running speed of the vehicle which is set by a driver of the vehicle during the automatic driving,
    wherein the running control device is configured to determine whether speed-deviation running in which the running speed is higher than the upper limit value is to be performed immediately before execution of the lane change control is started, and
    wherein the display device is configured to display a deviation value which is calculated based on a target value of the running speed and the upper limit value along with the upper limit value during the speed-deviation running when it is determined that the speed-deviation running is to be performed.

2. The automatic driving system according to claim 1, wherein
    the display device is further configured to display a set value of an inter-vehicle distance which is set by the driver,
    wherein the running control device is further configured to determine whether distance-deviation running in which the inter-vehicle distance is less than the set value is to be performed immediately before execution of the lane change control is started, and
    wherein the display device is further configured to display a deviation value which is calculated based on a predicted value of the inter-vehicle distance and the set value along with the set value during the distance-deviation running when it is determined that the distance-deviation running is to be performed.

3. An automatic driving system that is mounted in a vehicle, comprising:
    an information acquiring device configured to acquire driving environment information indicating a driving environment of the vehicle;
    a running control device configured to execute lane change control from a first lane to a second lane during automatic driving of the vehicle based on the driving environment information; and
    a display device configured to display, during the automatic driving, a set value of an inter-vehicle distance which is set by a driver of the vehicle,
    wherein the running control device is configured to determine whether distance-deviation running in which the inter-vehicle distance is less than the set value is to be performed immediately before execution of the lane change control is started, and
    wherein the display device is configured to display a deviation value which is calculated based on a predicted value of the inter-vehicle distance and the set value along with the set value during the distance-deviation running when it is determined that the distance-deviation running is to be performed.

* * * * *